United States Patent [19]

Thurlow

[11] Patent Number: 4,523,956

[45] Date of Patent: Jun. 18, 1985

[54] TRANSFER COATING METHODS, COMPOSITIONS AND PRODUCTS

[75] Inventor: John F. Thurlow, Gorham, Me.

[73] Assignee: Dennison Manufacturing Company, Framingham, Mass.

[21] Appl. No.: 270,170

[22] Filed: Jun. 3, 1981

Related U.S. Application Data

[63] Continuation of Ser. No. 817,767, Jul. 21, 1977, abandoned.

[51] Int. Cl.$^3$ .................. C08K 3/04; C08L 91/00; C08L 91/06; C08L 91/08
[52] U.S. Cl. .................. 106/243; 106/14.5; 106/27; 106/31; 106/271; 106/272
[58] Field of Search .............. 106/14.5, 31, 243, 245, 106/251, 268, 271, 272, 266, 27

[56] References Cited

U.S. PATENT DOCUMENTS

| | | | |
|---|---|---|---|
| 2,451,362 | 10/1948 | Snyder | 106/272 |
| 2,992,936 | 7/1961 | Rowland | 106/214 |
| 3,066,035 | 11/1962 | Albert | 106/211 |
| 3,314,814 | 4/1967 | Newman | 427/146 |
| 3,513,000 | 5/1970 | Vrancken et al. | 106/14.5 |
| 3,635,747 | 1/1972 | Skees et al. | 428/328 |
| 3,819,397 | 6/1974 | Ehrhardt et al. | 106/31 |
| 3,996,179 | 12/1976 | Haus et al. | 106/22 |

FOREIGN PATENT DOCUMENTS

| | | |
|---|---|---|
| 1421444 | 10/1968 | Fed. Rep. of Germany . |
| 465386 | 12/1968 | Switzerland . |

*Primary Examiner*—Allan M. Lieberman
*Attorney, Agent, or Firm*—George E. Kersey; Barry D. Josephs

[57] ABSTRACT

Coating methods and compositions for products and transfer media, such as carbon papers, in which the major constituent is a filler such as clay, titanium dioxide, calcium carbonate, or the like. The filler replaces a substantial amount of, and extends, the wax or wax-like material which ordinarily forms the principal part of a transfer coating, while providing improved transfer characteristics. The coating is prepared as a dispersion of the filler or extender, with wax or a wax-like material and colorant, in a low viscosity medium such as water. The coating can thereafter be applied to a substrate to provide a desired product by using suitable equipment, such as a trailing blade coater, which may be incorporated into a paper making machine or used separately.

11 Claims, 6 Drawing Figures

4,523,956

TRANSFER COATING METHODS, COMPOSITIONS AND PRODUCTS

This is a continuation of Ser. No. 817,767, filed July 21, 1977 and now abandoned.

BACKGROUND OF THE INVENTION

This invention relates to the transfer of impressions from one surface to another and more particularly to the transfer of pressure applied impressions by the use of coatings.

Coatings for the transfer of impressions are typically formed from waxes or wax-like materials, to which a colorant or blend of colorants has been added. Other materials are added when special properties are desired. The ensuing mixture is then generally applied to a substrate such as paper either in molten form or in solution with one or more organic solvents. In the case of a paper substrate the resulting product is commonly known as carbon or transfer paper. The product is also known as "one-time" carbon paper when it is intended for a single use.

The usual manufacturing procedure for transfer coatings and their products is relatively slow and cumbersome. Their ingredients are costly and in short supply. In addition special equipment is required when the coatings are applied in molten and organic solvent form. Moreover, the coatings formed on product substrates tend to be relaatively thick. By comparison with the results from using thinner or harder coatings, the transfer images from relatively thick coatings typically have reduced definition, particularly when used to form a large number of copies.

Attempts have been made to avoid the objections of organic solvent coatings by using aqueous or water soluble coating formulations. One such example is set forth in U.S. Pat. No. 2,931,752. However, the coatings produced in accordance with that patent continue to employ costly raw materials which are now in short supply and have reduced image definition by comparison with standard coatings of comparable thickness.

Aqueous coatings have also been used in the production of donorreceptor copy papers to provide what is commonly known as "mated" systems. One example is U.S. Pat. No. 3,635,747. Not only are there the disadvantages and waste of the mated system, the transfer images again, tend to have reduced definition.

Similarly in Swiss Pat. No. 465,386 and German Pat. No. 1 421 444 the use of aqueous coatings is accompanied by production and technical disadvantages as well as a failure to obtain the desired image definition.

Accordingly it is an object of the invention to expedite the manufacture of transfer coatings and their products. A related object is to expedite the production of coatings for transfer media such as carbon papers.

A further object of the invention is to increase the flexibility with which transfer coatings and their products can be manufactured. A related object is to permit the manufacture of transfer media such as carbon papers directly in conjunction with the operation of a paper making machine, or as an adjunct to the paper making process.

Still another object of the invention is to avoid the equipment complexities of molten and organic solvent coating systems. A related object is to adapt aqueous coating equipment to the manufacture of transfer media while improving the quality and image definition achievable with the resulting product.

A still further object of the invention is to reduce the overall cost of the raw materials employed in the production of coatings for transfer media. A related object is to reduce the extent of the conventional materials employed in transfer coatings, without impairing image definition.

Yet another object of the invention is to achieve a comparatively low cost aqueous coating system which provides improved image definition.

SUMMARY OF THE INVENTION

In accomplishing the foregoing and related objects the invention employs coating materials that are dispersable in a liquid medium with a major portion of the relatively expensive conventional constituents sunstituted by a comparatively less expensive fine particle inorganic filler material. The filler serves to extend the conventional constituents while providing improved transfer characteristics. Suitable fillers or extenders are clay, titanium dioxide, calcium carbonate, and the like.

The coating is prepared as a dispersion of the extender with wax or a wax-like material and the colorant in a low viscosity medium such as water. As a result the coating can be applied either during the conventional paper making process or as an adjunct to that process.

In accordance with one aspect of the invention the coating constituents are dispersed separately into the liquid medium. The ingredients are desirably dispersed with the filler first, the wax or wax-like material next, followed by the colorant.

In accordance with a further aspect of the invention the major part of a coating composition is formed by the filler extender. The amount of wax is in the range from 10 to 40% of the amount of filler and a particularly advantageous coating is realized when the wax is present to the extent of 20%. The colorant, which is desirably carbon black, is present in the range from 5 to 35%, desirably 16%, of the amount of filler.

In accordance with another aspect of the invention the coating is applied to a flexible member, desirably paper, during a conventional paper making process using a coater which is advantageously of the trailing blade type.

DESCRIPTION OF THE DRAWINGS

Other aspects of the invention will become apparent after considering several illustrative embodiments, taken in conjunction with the drawings in which.

DETAILED DESCRIPTION

Figure 1:
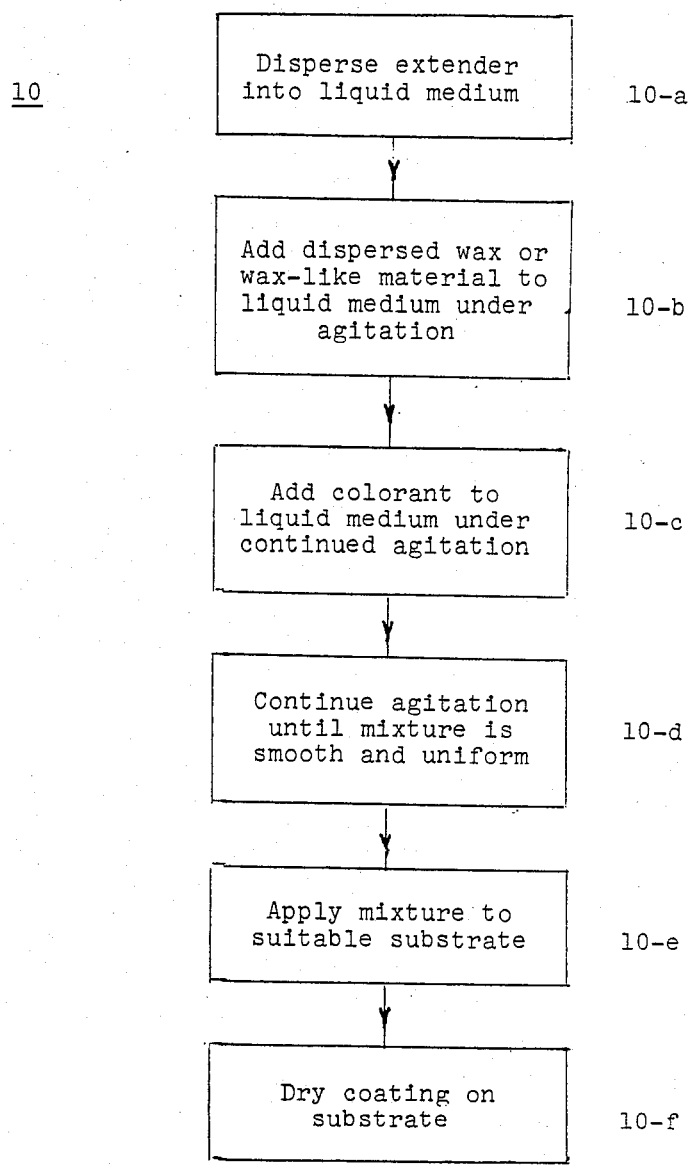
FIG. 1 is a flow chart of process steps for practicing the invention.

Turning to the Flow Chart 10 of FIG. 1, a first process step 10-a is a method for the preparation of a transfer coating in accordance with the invention is the dispersion of a filler or extender material into a liquid carrier medium.

The extender, in keeping with the invention, is a replacement for a substantial amount of the wax or wax-like material which ordinarily is used for the transfer of images. The extender may be fine particle inorganic material which is readily dispersed in the carrier medium. Illustratively, extenders include fine particle inorganic materials such as clay, titanium dioxide, and calcium carbonate. A suitable carrier medium is water, but other low viscosity fluids may be employed as well. It is desirable for the extender to be accompanied by a dispersal agent. Otherwise a suitable agent, such as trisodiumphosphate, can be added.

In the second process step 10-b a minor amount of wax or wax-like material is added to the carrier medium while under agitation. A suitable wax is any plastic substance which is hard when cool, and soft when warm, including various esters, fatty acids and solid hydrocarbons. Both natural and synthetic materials can be used. The plastic additive is desirably in the form of an emulsion. If the plastic is not emulsified, an emulsifier, such as oleic acid and triethylamine, can be added.

In the third process 10-c step a minor amount of colorant is added to the carrier medium which continues to be under agitation. The colorant is desirably in the form of a dispersion. If unaccompanied by a dispersal agent, a suitable agent such as tetrasodiumpyrophosphate can be added. The colorant may be any insoluble pigment or insoluble dye, but is preferably carbon black for most uses for both cost and performance reasons.

In the fourth process step 10-d the liquid carrier medium and dispersed materials are agitated until the mixture is smooth and uniform. This may be achieved by using a colloid mill to assure complete mixing and stirring.

In the fifth process step 10-e the mixture is applied to a suitable substrate, such as a paper backing sheet. A wide variety of techniques may be employed including the various coating assemblages described in detail below.

In the final process step 10-f moisture is removed from the coated substrate by passing it through conventional drying equipment. The preferred method of drying is to use a heated roll at a temperature below the melting point of any constituent of the composition. Since the wax component has the lowest melting point, the drying temperature is below that level.

Clays which are suitable for the practice of the invention are obtainable from the Georgia Kaolin Company, Elizabeth, N.J.; Englehard Mineals and Chemical Corp., Edison, N.J.; Freeport Minerals Co., New York, and Anglo American Glass Corp., Atlanta, Ga. Titanium dioxide for the practice of the invention is obtainable from SCM Corp., Glidden Durkee Division, Baltimore, Md.; E.I. duPont de Nemours and Co., Wilmington, Del., and J. M. Huber Corp., Huber, Ga. Calcium carbonate, either ground from limestone or synthesized by precipitation, for practice of the invention is obtainable from Pfizer Corp., New York and Georgia Marble Co., Atlanta, Ga. It is advantageous to use an extender which is accompanied by a dispersal agent. Otherwise a suitable dispersal agent such as trisodium phosphate can be added. An illustrative dispersed clay extender or filler is sold and marketed under the name "Hydrasperse" by the J. M. Huber Corporation of Menlo Park, N.J. To fully disperse the extender into the carrier liquid thorough mixing desirably takes place using either or both a Kady mill or colloid mill.

Natural waxes for the practice of the invention include Carnauba, which is an exudate from the pores of the leaves of the Brazilian wax palm; condelilla, which is obtained from the Condelilla plant found largely in Mexico; Esparto which is also known as Spanish Grass Wax and is found elsewhere in the Mediterranean region; Sugar Cane Wax made by extrusion with heptane in the production of sugar cane; Ouricury, which is similar to Carnauba and is obtained from the palm leaf; Montan, which is obtained by extrusion of lignite; Ozocerite, also known as Ozokerite, which is a yellowish brown mineral wax occurring naturally as a mixture of solid hydrocarbons; and Beeswax.

The synthetic waxes include those made by purifying Montan wax and synthetic paraffin wax. Another suitable synthetic wax is microwax hich is characterized by a microcrystalline structure and is produced in a fashion similar to that of the synthetic paraffins.

Natural and synthetic waxes which are suitable for the practice of the invention can be obtained from the Allied Chemical Corporation, Morristown, N.J., American Hoechst Corp., Somerville, N.J.; Amoco Chemical Corp., Chicago, Ill.; Boler Petroleum Co., Ardmore, Pa.; Diamond Shamrock Corp., Morristown, N.J.; Gulf Oil Chemicals Corp., Houston, Tex.; Hercules, Inc., Wilmington, Del.; Lukon, Leominster, Mass.; Mobil Chemical Co., New York City; Moore and Munger, Inc., Stamford, Conn.; Sun Oil Co., Philadelphia, Pa.; and U.S. Industrial Chemicals Co., New York City.

Wax-like materials for the practice of the invention include metallic salts of fatty acids of at least eleven carbon atoms and preferably of at least eighteen carbon atoms such as stearates, oleates or linoleates of zinc, calcium, barium, magnesium, aluminum and zirconium. Such wax-like materials are sold in dry or water dispersed form by such suppliers as Diamond Shamrock Corp., Morristown, N.J.; Mallinckrodt, Inc., St. Louis, Mo., Synthetic Products Co., Cleveland, Ohio, and Witco Chemical Corp., New York City.

The waxy product is desirably an emulsion. If the wax is not emulsified, an emulsifier such as oleic acid and triethanolamine can be added.

Illustrative colorants are water insoluble pigments and dyes, such as carbon blacks, which lead themselves to dispersion in water, a clay slurry, a wax dispersion or a combined clay-wax dispersion. Such colorants are available from Ashland Chemical Co., Columbus, Ohio, Cabot Corporation, Boston, Mass., and Cities Service Co., Akron, Ohio. Carbon blacks are preferred where a black transfer image is desired. If the carbon black is not accompanied by its own dispersal agent, a suitable agent, such as tetrasodium pyrophosphate, can be added.

The coating prepared in accordance with the invention can be applied to a substrate, such as paper stock, in a variety of ways. The coatings are advantageously applied in conjunction with, or as an adjunct to, the standard manufacture of paper, using trailing blade coaters 20A through 20E illustrated in FIG. 2A through 2E. Such coaters are formed by a backing roll 21 which is covered by an elastomer such as rubber with an illustrative hardness of 70 (P and J). The backing roll 21 advantageously has a finished diameter of between 30 and 36 inches. The paper web 22 to be coated has a wrap of between approximately 90° and 180° around the roll 21, depending on the web, which is adjustably driven by fly rolls 23 with respect to the remainder of the coating machinery (not shown). The backing roll 21 is accompanied by a coating head or chamber 24a through 24c in the case of FIGS. 2A through 2C, and by rolls 24d and 24e in the case of FIGS. 2D and 2E. Blades 25a and 25b are used with the chambers 24a and 24b of FIGS. 2A and 2B, and blades 25c through 25e are used beyond the point of coating contact in FIGS. 2C through 2E.

Figure 2A:
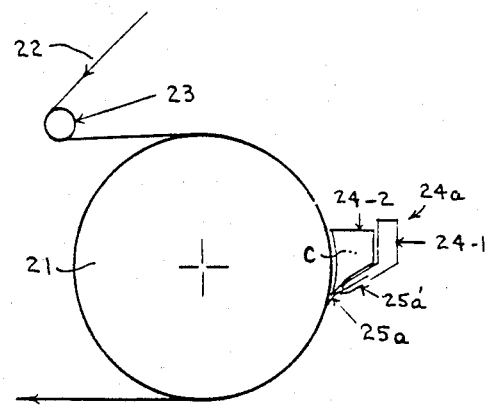
FIGS. 2A through 2E are representative trailing blade coaters for the practice of the invention.
Figure 2B:
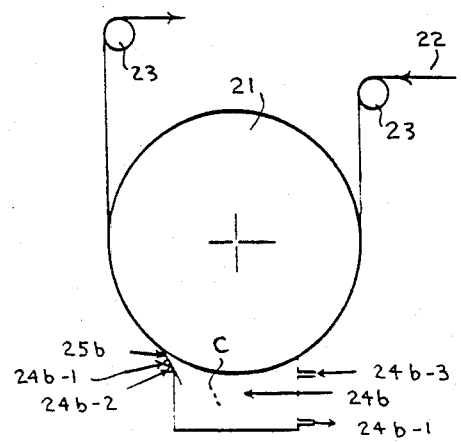
Figure 2C:
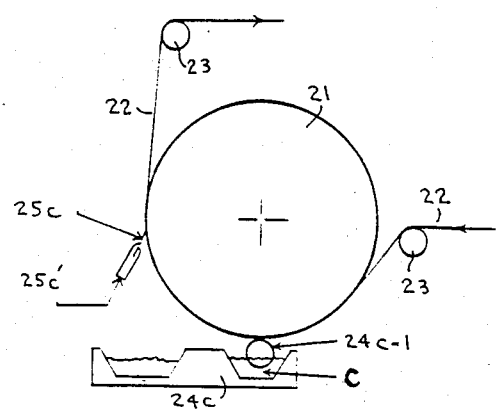

In FIG. 2A the coating head 24a is formed by a frame 24-1 with end retainers of which one retainer 24-2, also known as a "dam" is visible. The blade 25a serves as an extension of the frame 24-1 into engagement with the web 22. The blade 25a is held in place by releasable jaws. Once the blade has been adjusted, the chamber 24a is filled with a coating composition C prepared in accordance with the flow chart of FIG. 1.

Where it is important to be able to change blades quickly the "enclosed pond" coater 20B of FIG. 2B is employed. In this coater the coating composition C is enclosed in a chamber 24b. A blade 25b is held in place by pressurized plastic tubes 24b-1 and 24b-2. The blade 25b is easily changed by releasing the pressure in the tubes 24b-1 and 24b-2. The coating C enters the chamber 24b at an inlet 24b-3 and is removed at an outlet 24b-4.

Where it is important to start and stop the coating operation quickly, the "flooded nip" coater 20C of FIG. 2C is employed. This coater has a chamber 24c with an applicator roll 24c-1 that permits quick starts and stops. The blade 25c of FIG. 2C has an upside down configuration similar to that of FIG. 2B.

Figure 2D:
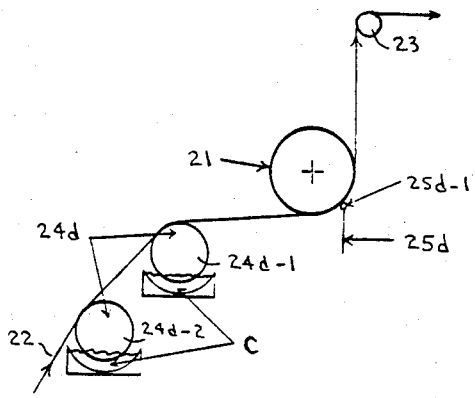

Another suitable coater for the practice of the invention is of the "flex" type as shown in FIG. 2D. This coater uses one or more applicator rollers, with two such rolls 24d-1 and 24d-2 in FIG. 2D, without backing rolls. In addition the blade 25d is a modification of what is shown in FIGS. 2A through 2C. The blade 25d of FIG. 2D makes use of a revolving rod 25d-1 at the point of contact with the web on the backing roll 21. The rod revolves against the direction of web travel thus smoothing the coating on the sheet. The reverse direction of rotation of the rod 25d-1 also increases the flooding action in the nip and reduces the number of streaks and scratches that appear in the coating. The thickness of the coating is determined by the pressure of the blade 25d against the web and by the diameter of the revolving rod 25d-1.

Figure 2E:
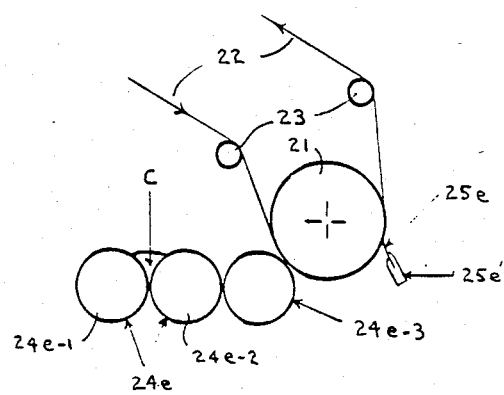

Another coater that can be used in the practice of the invention is the coater 20E in FIG. 2E. Like the coater of FIGS. 2B and 2C, the coater 20E uses an inverted blade 25e. This provides a flushing action that keeps the nip clean. To apply the coating the material is disposed at the nip of two gate rolls 24e-1 and 24e-2. It is carried from the second gate roll 24e-2 to a transfer roll 24e-3 and applied to the web before the blade 25e. The weight of the coating is controlled by the position of the blade against the web. One technicue for controlling the blade is by the use of air cylinders which move the blade relative to its holder. Like the flooded nip coater of FIG. 2C, the transfer roll coater of FIG. 2E is able to start and stop rapidly.

It will be appreciated that the various features of the coater shown in FIGS. 2A through 2E may be combined in a variety of ways.

The practice of the invention is illustrated by the following non-limiting examples:

EXAMPLE I 100 parts of finely divided clay were dispersed in a water medium. 20 parts of finely divided wax in the form of calcium stearate were added to the water medium under agitation in a ball or colloid mill. 15 parts of colorant in the form of carbon black were then added to the mix while under continued agitation which was continued further until the materials were uniformly dispersed. The coating mix was then spread using a trailing blade coater on a roll of paper being processed by a paper making machine. After the coating was suitably dried it was round to give superior transfer impressions when tested.

EXAMPLE II

Example I was repeated except that the colorant was 20 parts of carbon black. The resulting transfer impressions were satisfactory, but were more dispersed than those of Example I.

EXAMPLE III

Example I was repeated except that the colorant was 25 parts of carbon black. The resulting transfer impressions were more satisfactory, than those of Example II.

EXAMPLE IV

Example I was repeated except that the colorant was 30 parts of carbon black. The resulting transfer impressions were satisfactory, but were more dispersed than those of Example III.

EXAMPLE V

Example I was repeated except that the colorant was 15 parts of carbon black. The resulting transfer impressions that were satisfactory, but were less dense than those of Example I.

EXAMPLE VI

Example I was repeated except that the colorant was 10 parts of carbon black. The resulting transfer impressions were satisfactory, but were less dense than those of Example V.

EXAMPLE VII

Example I was repeated except that the colorant was 5 parts of carbon black. The resulting transfer impressions were satisfactory, but were less dense than those of Example VI.

EXAMPLE VIII

Example I was repeated except that the colorant was 2.5 parts of carbon black. The resulting transfer impressions were at the lower threshold of acceptability.

EXAMPLE IX 15 parts of carbon black were mixed with 20 parts of wax in the form of calcium stearate. This preliminary mix was further mixed with 100 parts of clay. The resulting mix was then dispersed into water and milled until the dispersion was smooth and uniform. The coating mix was then applied to a roll of paper using a trailing blade. The result was similar to that of Example I.

EXAMPLE X

Example IX was repeated except that the wax was reduced to 10 parts. The result was satisfactory, with the density of Example IX reduced.

EXAMPLE XI

Example IX was repeated except that the wax was increased to 30 parts. The result was satisfactory, with the density of Example IX increased.

EXAMPLE XII

Example IX was repeated except that the wax was increased to 40 parts. The result was satisfactory, with the density at the threshold of acceptance.

EXAMPLE XIII 15 parts of carbon black were dispersed in a water medium. 30 parts of wax in the form of calcium stearate were added to the medium under agitation. The resulting mix was further mixed with 100 parts of clay and the final mix spread evenly on a layer of paper by a trailing blade. The result was similar to that of Example I.

EXAMPLE XIV

Example XIII was repeated except that the constituents were premixed before being dispersed in the water medium. The result was similar to that of Example I.

The amount of colorant can range from 5 to 25 parts for each 100 parts of extender, while the amount of wax can range from 10 to 40 parts.

The preferred amount of colorant is 15 parts per 100 parts of extender material. For colorant beyond 15 parts to approximately 30 parts the transfer images become increasingly dispersed as the amount of colorant increases. Conversely, for colorant below 15 parts per 100 parts of extender, as low as 2.5 parts per 100 parts of extender the transfer images have a progressively reduced density such that 2.5 parts per 100 represents the threshold of acceptable transfer performance.

The preferred amount of wax is 20 parts per 100. The amount of wax may be reduced to as low as 10 parts per 100 which reduced the density of the transfer and it may be increased to as much as 40 parts per hundred which increases the density of the transfer. For wax in excess of 40 parts per hundred, not only is the amount of transfer excessive, but it represents a wasteage of the wax. Conversely, for amounts below 10 parts per hundred of wax the amount of material deposited in the transfer is inadequate for good copy.

While various aspects of the invention have been set forth by the drawings and the specifications, it is to be understood that the foregoing detailed description is for illustration only and that various changes in parts, as well as the substitution of equivalent constituents for those shown and described, may be made without departing from the spirit and scope of the invention as set forth in the appended claims.

What is claimed is:

1. A coating composition comprising a non-soluble aqueous dispersion of:
   (1) an inorganic filler material;
   (2) carbon black colorant present in the range from about 5% to about 35% of the amount of said filler; and
   (3) a wax or wax-like material selected from the group consisting of carnauba, palm, condelilla, esparto, sugar cane, ouricury, montan, ozocerite, paraffin, and microcrystalline waxes, and metallic salts of fatty acids of at least eleven carbon atoms; in which the filler is substituted for a portion of the wax or wax-like material and colorant without impairing the transfer quality of the composition; said wax or wax-like material being in the range from about 10% to about 40% of the amount of said filler.

2. A coating composition in accordance with claim 1 wherein said nonsoluble dispersion includes:
   (1) 100 parts of said inorganic filler material;
   (2) 16 parts of said carbon black colorant;
   (3) 20 parts of said wax or wax-like material.

3. A coating composition in accordance with claim 1 wherein said carbon black is dispersible in water.

4. A coating composition in accordance with claim 1 wherein said carbon black is accompanied by a dispersal agent.

5. A coating composition as defined in claim 1 wherein a dispersal agent is included as tetra sodium pyrophosphate.

6. A coating composition in accordance with claim 1 wherein said inorganic filler is ground or synthesized by precipitation.

7. A coating composition in accordance with claim 1 wherein said inorganic filler is accompanied by a dispersal agent.

8. A coating composition in accordance with claim 1 wherein a dispersal agent is included as trisodiumphosphate.

9. A coating composition in accordance with claim 1 wherein said wax is in the form of an emulsion.

10. A coating composition in accordance with claim 1 wherein an emulsion is produced using an emulsifier of oleic acid and triethanol amine.

11. A coating composition as defined in claim 1 wherein said inorganic filler material includes clay, titanium dioxide, and calcium carbonate.

* * * * *